RADIO FREQUENCY TRANSMISSION LINE SWITCHING SYSTEM

Filed April 14, 1959 5 Sheets-Sheet 1

INVENTOR
LAWRENCE WATKINS STINSON
BY
Moses, Nolte, & Nolte
ATTORNEYS

RADIO FREQUENCY TRANSMISSION LINE SWITCHING SYSTEM

Filed April 14, 1959 5 Sheets-Sheet 2

INVENTOR
LAWRENCE WATKINS STINSON
BY
Moses, Nolte, & Nolte
ATTORNEYS

Nov. 14, 1961 L. W. STINSON 3,009,118

RADIO FREQUENCY TRANSMISSION LINE SWITCHING SYSTEM

Filed April 14, 1959 5 Sheets-Sheet 3

INVENTOR
LAWRENCE WATKINS STINSON
BY
Moses, Nolte, & Nolte
ATTORNEYS

Nov. 14, 1961 L. W. STINSON 3,009,118
RADIO FREQUENCY TRANSMISSION LINE SWITCHING SYSTEM
Filed April 14, 1959 5 Sheets-Sheet 4

INVENTOR
LAWRENCE WATKINS STINSON
BY
Moses, Nolte & Nolte
ATTORNEYS

RADIO FREQUENCY TRANSMISSION LINE SWITCHING SYSTEM

Filed April 14, 1959 5 Sheets-Sheet 5

INVENTOR
LAWRENCE WATKINS STINSON
BY
Moses, Nolte, & Nolte
ATTORNEYS

United States Patent Office 3,009,118

Patented Nov. 14, 1961

3,009,118

RADIO FREQUENCY TRANSMISSION LINE SWITCHING SYSTEM

Lawrence Watkins Stinson, Dallas, Tex., assignor to Continental Electronics Manufacturing Company, Dallas, Tex., a corporation of Texas Filed Apr. 14, 1959, Ser. No. 806,306

5 Claims. (Cl. 333—7)

The present invention relates to a radio frequency transmission line switching system.

The invention provides a system for enabling any one of a first set of radio frequency devices to be connected to any one of a second set of radio frequency devices by transmission line switching means. It is an object of the invention to provide a radio frequency switching system of this type which has the following desiderata. It is mechanically simple and hence of the greatest long-term reliability. Secondly, the system is designed to permit accurate calculation of the cross-talk under the worst conditions of coupling. Thirdly, the system has a low voltage standing wave ratio and a reasonably high characteristic impedance through the switches. Fourthly, the system has complete flexibility of switching and has a modular construction capable of standardized expansion to any extent desired. Lastly, it is capable of reliable remote control operation and manual control locally.

The above objects and other objects and advantages are obtained by providing first and second sets of transmission lines which run transversely to each other and have connecting lines running from the first set to the second set at the cross-over points. At each intersection of a connecting line with one of the transmission lines a switch is provided for either connecting the connecting line to the transmission lines, or disconnecting the connecting line from the transmission lines and completing through connections of the transmission lines. The two switches at the end of each connecting line are interconnected for operation in unison, either manually or by means of a motor which can be remotely controlled. The transmission line and the connecting line may be unbalanced or balanced transmission lines comprising, in the first case, one conductor, and, in the second case, two conductors within a hollow metallic shield. When a transmission line is connected to a connecting line by a switch, a portion of the inner conductors is removed for disconnecting the terminal portion of the transmission line. The dimensions of the shields are such that they act as hollow wave guides subjected to frequencies below their cut-off frequency when the inner conductors are removed. By virtue of this fact, the portions of the transmission lines in which the conductors are removed during switching have very high impedances to operating frequencies and provide a very low coupling across the open switch.

The invention will be fully understood and other objects and advantages will become apparent from the following description and the accompanying drawings in which:

FIG. 9 is a diagram of a fluid controlled switching arrangement according to another embodiment of the invention.

Figure 1:
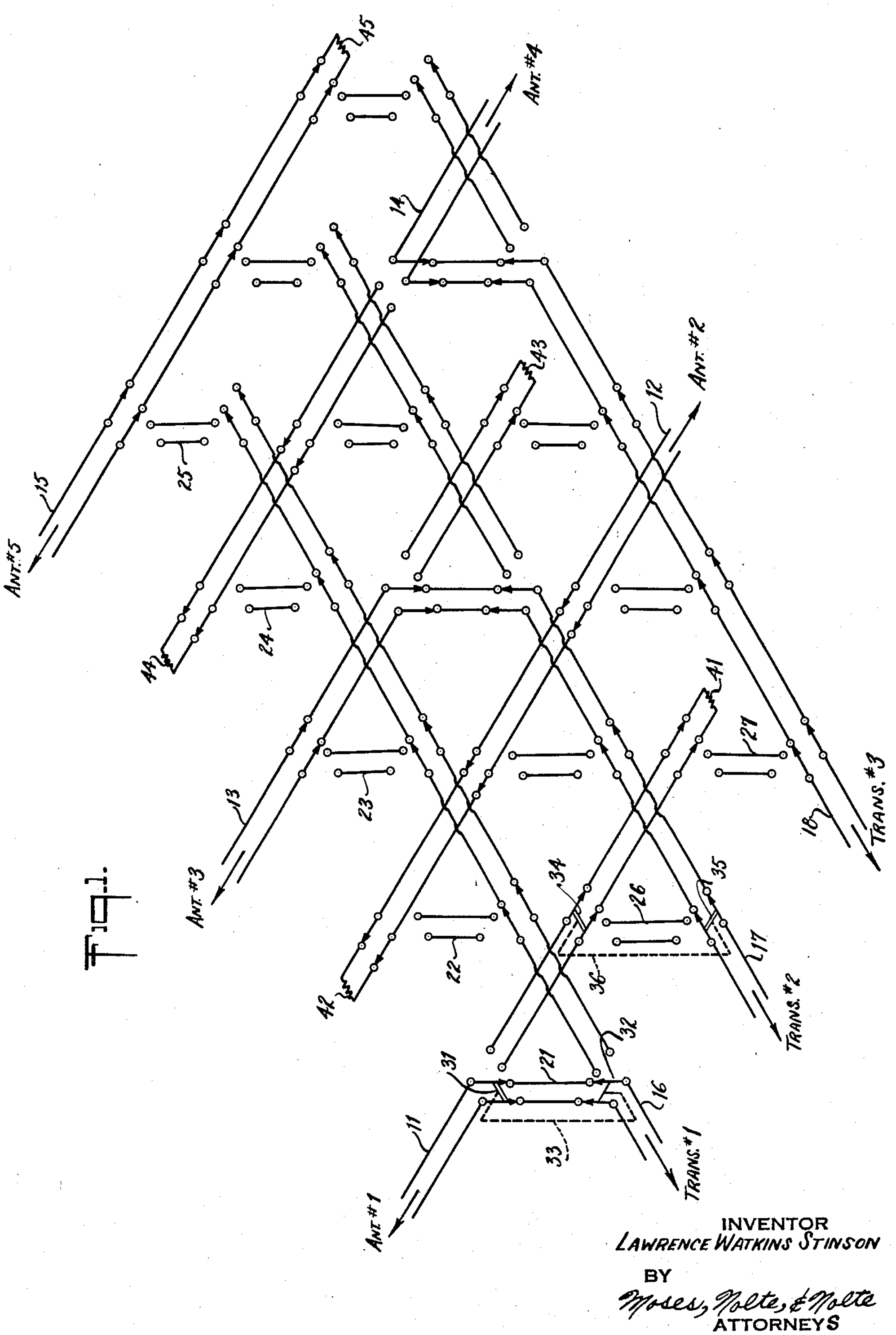
FIG. 1 is a schematic diagram of a transmission line switching system.

Referring to FIG. 1 there are shown a first set of transmission lines 11 to 15 adapted to be connected at one end to a plurality of antennas. A second set of transmission lines 16 to 18 are adapted to be connected, say, to different transmitters. The transmission lines of the first set and the second set preferably run perpendicularly to each other and are suitably spaced apart. At each cross-over point of the transmission line a connecting line 21—27, etc., extends between the upper and lower transmission lines. At the ends of the connecting lines, there are double-pole double-throw switches 31, 32, which are adapted to connect for example, antenna No. 1 to transmitter No. 1 via lines 11 and 16 and in so doing to disconnect the antenna end of transmission line 11 from the remainder thereof, and, similarly, to disconnect the transmitter end of line 16 from the remainder thereof.

Switches 31 and 32 have a connection 33 for enabling them to be operated in unison. When the switches are disconnected from a connecting line, as shown at 34 and 35, they form through connections for the transmission lines 11 and 17. The switches 34 and 35, as well as the switches at any other cross-over point, may have connections 36 for enabling them to be operated in unison. At their remote end, transmission lines 11 to 15 are provided with terminating impedances 41 to 45. It will be evident that with the switching system shown in FIG. 1 any transmitter can be connected to any antenna by a single switch operation which may be performed manually or by a remotely controlled motor.

Figures 2, 3:
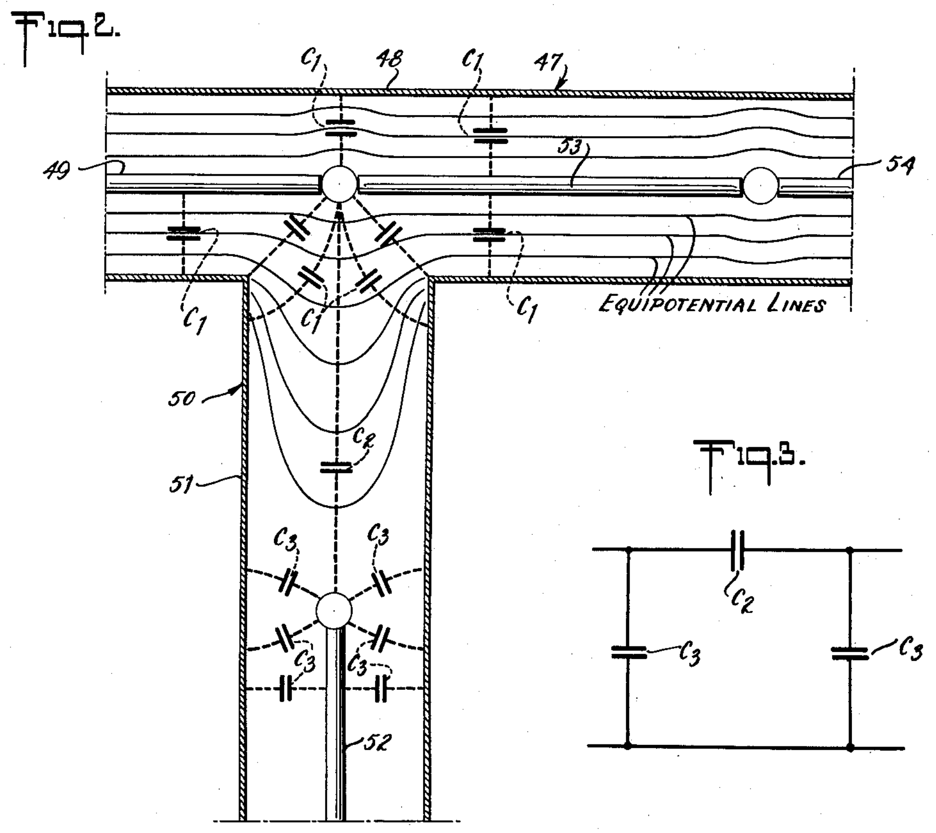
FIG. 2 is a diagram showing the field distribution in transmission lines having a movable conductor switch.
FIG. 3 is an equivalent mutual capacitance diagram of FIG. 2.
Figure 4:
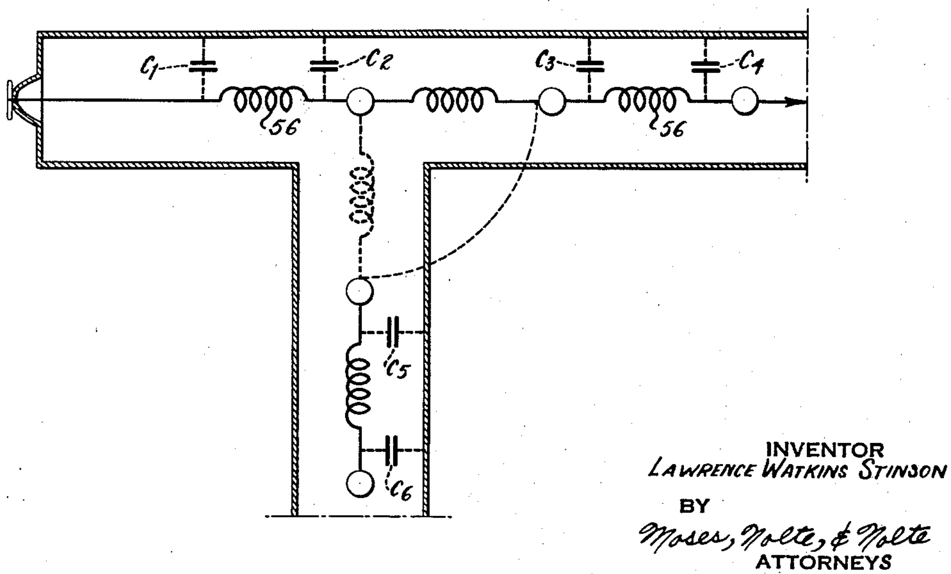
FIG. 4 is a schematic diagram of a modified transmission line according to the invention.

The switching technique employed in the present invention may be explained with reference to FIGURES 2 and 3. Transmission line 47 has an outer conductor 48 and an inner conductor 49 and another transmission line, which may be a connecting line 50, has an outer conductor 51 and an inner conductor 52. The capacitance between the inner and outer conductors 48 and 49 is represented by $C_1$, the capacitance between the inner and outer conductor 51 and 52 by $C_3$ and the capacitive coupling between inner conductor 49 and inner conductor 52 is represented by $C_2$. Movable switch blade 53 connecting inner conductors 49 and 54 can be moved from the position shown to a vertical position to form a connection between inner conductors 49 and 52 to interconnect transmission lines 47 and 50. The outer conductors are designed so that without the inner conductors they behave as hollow wave guides having a cut-off frequency higher than the operating frequency. It is well known from wave guide theory that a hollow conductor has a cut-off frequency and that it can propagate radio frequency waves efficiently so long as the frequency of the radio wave is above the cut-off frequency of the wave guide, but that the attenuation is very great if the frequency of the waves is below the cut-off frequency of the wave guide. For this reason, the attenuation through the uppermost portion of outer conductor 51 will be very high and, accordingly, the coupling represented by a capacitor $C_2$ between inner conductors 49 and 52 will be very low. From another viewpoint it may be said that the equal potential lines in transmission line 47 will not extend to or will be greatly attenuated before reaching inner conductor 52 when the movable switch blade 53 is in the position shown. Conversely, by moving switch blade 53 to the vertical position thus connecting conductors 49 and 52, there will be a high attenuation between conductors 49 and 54. Referring to FIG. 3, it will be evident that when $C_1$ and $C_3$ are relatively large and $C_2$ is very small, there will be very little voltage developed across the capacitance $C_3$.

Hence, there will be very little coupling from line 47 to line 50 across the open switch.

The transmission lines forming the switching arrangement of FIG. 1 unavoidably have irregularities therein. In order to overcome the effects of these irregularities the transmission lines may be provided with elements 56 forming low pass filter sections with the inter-conductor capacitances $C_1$—$C_6$. These filters provide a design variable with which to control or compensate the irregularities within the line.

Figure 5:
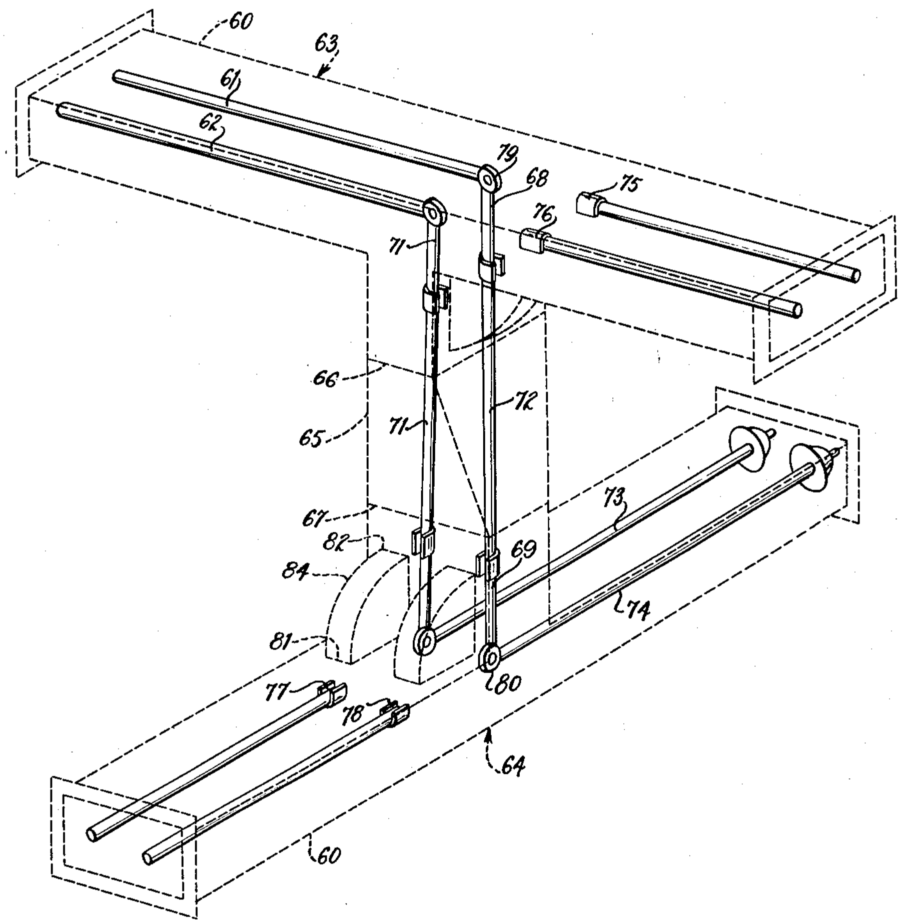
FIG. 5 is a schematic view of the transmission line switch unit at one cross-over point.

FIG. 5 shows a transmission line switch unit for balanced transmission lines. The lines comprise outer conductors 60 which may be rectangular and pairs of inner conductors 61, 62, 73 and 74. It may be assumed that the left hand end of the upper conductor 63 is connected to an antenna and the right hand end of line 64 is connected to a transmitter. The outer conductors of lines 63 and 64 interconnected by stub line 65 which is twisted, having the cross-section 66 at its upper end and cross-section 67 at its lower end. It will be noted that the outer conductors 60 are in the form of rectangular wave guides. Double-throw, double-pole switches 68, 69 are adapted to be turned so as to connect conductors 61, 62 to the conductors 71 and 72, and to connect the latter to the conductors 73 and 74. When switch 68 is turned its switch blades are moved from the terminals of conductors 71 and 72 to terminals 75 and 76, and in the same manner the switch 69 is connected to the terminals 77 and 78 when it is turned down in the horizontal position. In order to permit the switch blades to move from one position to the other about their pivots 79 and 80 the rectangular shields are provided with cut-outs 81 and 82 over which 90° metallic covers 84 are placed. The switch blades thus move through the openings 81 and 82 and covers 84 from one position to the other. As previously mentioned the switches 68 and 69 are preferably interconnected for operation in unison.

When the switch 68 is in the position shown in FIG. 5, the portion of wave guide 60 between pivot 79 and terminal 75 will act as an ordinary rectangular wave guide, and it is designed to have a cut-off frequency higher than the frequency of the radio wave being transmitted over the lines. Therefore, the attenuation in the portion of the wave guide between the point 79 and terminals 75 and 76 have a very high attenuation and there will be a very small coupling across the open switch. The same conditions of course, prevail in the lower transmission line 64 between the pivot points 80 and the terminals 77 and 78.

Figure 6:
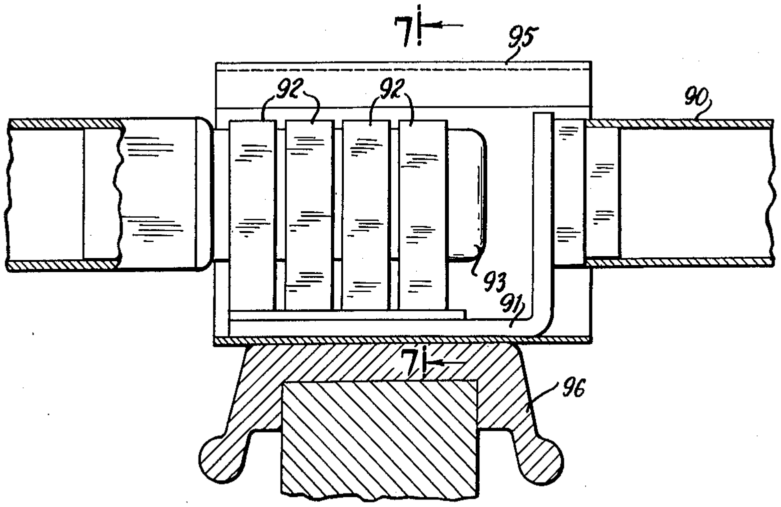
FIGS. 6 to 8 are partly sectional views of the contacts of one of the switches.
Figure 7:
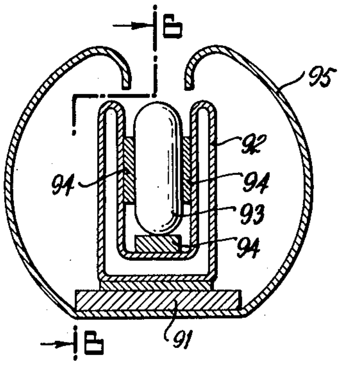
Figure 8:
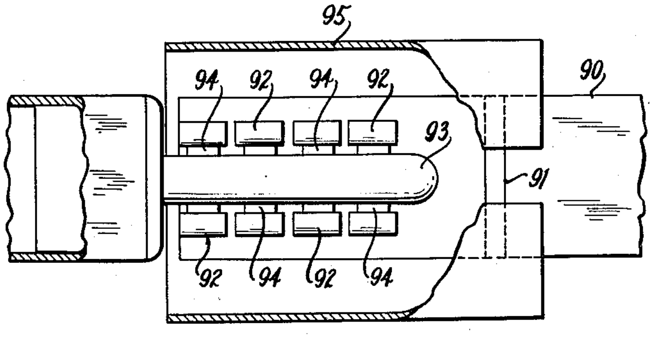
Figure 8:
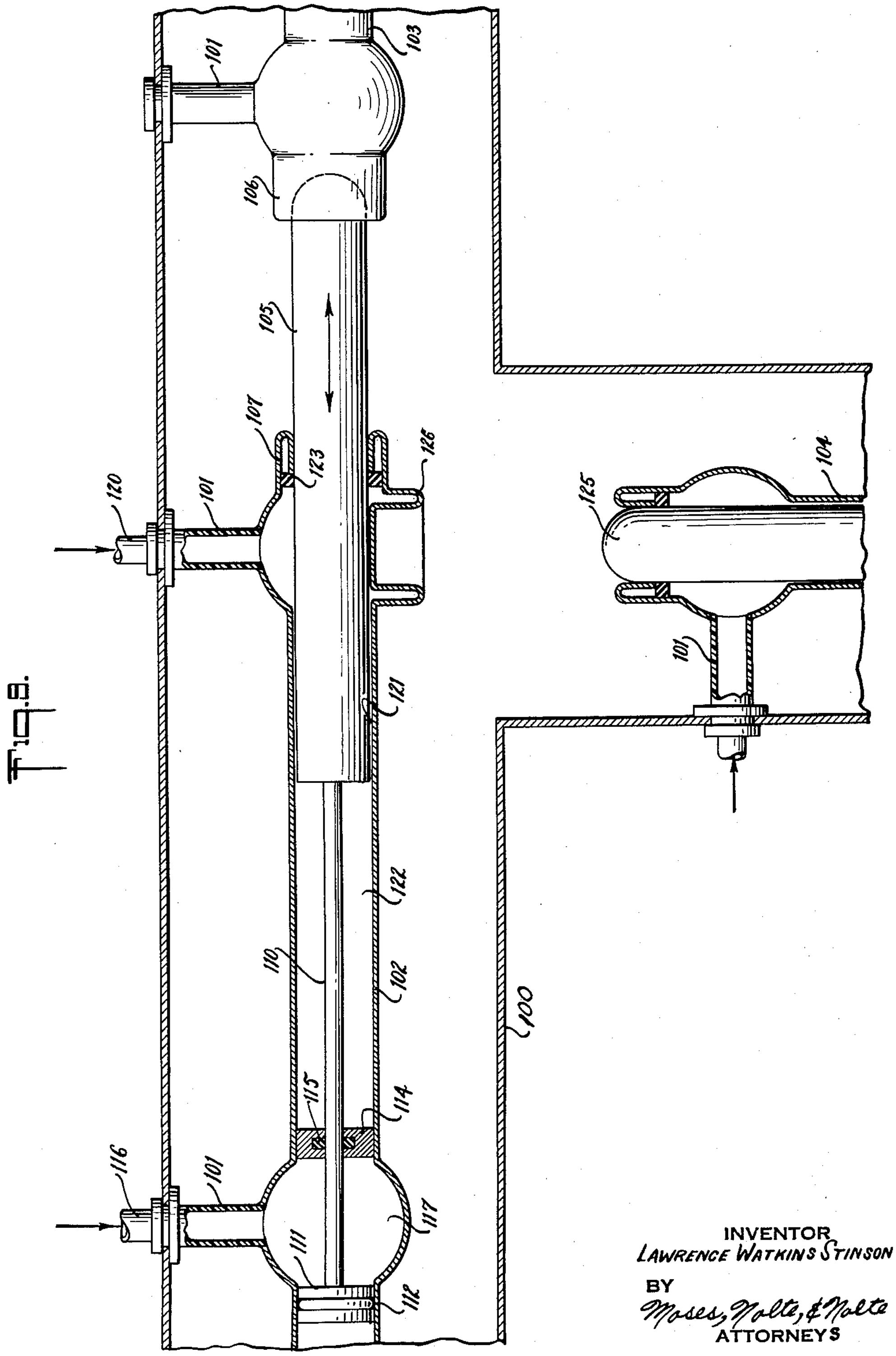

FIGS. 6, 7 and 8 show some details of the contacts 75—78 etc. of switches 68 and 69 in FIG. 5. One portion of a conductor 90 is integral with a bracket 91. On bracket 91 there are mounted a plurality of heavy individual conductor fingers 92 forming a socket for a switch blade 93. The fingers 92 are preferably provided with contact buttons 94 formed of sintered silver graphite. It has been found that such silver graphite buttons are capable of handling extremely heavy currents, without excessive heating. The switch blade 93 may be pivotally connected to one of the conductors as indicated in FIG. 5. A corona shield 95 preferably extends round the socket formed by fingers 92. A suitable insulating support 96 may be provided for the corona shield.

Remotely controllable switching is shown in FIG. 9. Here the outer shielding enclosure 100 includes insulators 101 for supporting the inner conductors 102, 103 and 104. Within the conductor 102 there is a movable conductive cylinder 105 which forms a switch element for connecting or disconnecting conductors 102 and 103. In the extended position shown in FIG. 9, cylinder 105 which is preferably made with a rounded end, fits into a fixed socket 106 and thereby completes the connection between conductors 102 and 103. Good connection between conductor 102 and cylinder 105 is provided by spring contact fingers 107. Cylinder 105 is connected to a piston rod 110 having a piston 111 including an O-ring 112. Around piston rod 110 there is also a partition 114 having an O-ring 115, providing a fluid tight chamber 117 between piston 111 and partition 114. Air or other fluid may be admitted by pipes 116 into the chamber from a suitable pump or pressure source. The fluid fills chamber 117 thereby forcing pistons 111 to the left and retracting cylinder 105 to break the connection between lines 102 and 103. When it is desired to connect cylinder 105 to socket 106 air is admitted through pipe 120 and the space 121 between cylinder 105 and conductor 102 into a chamber 122, raising the pressure in this chamber and forcing cylinder 105 to the right into socket 106. An air tight seal is provided between cylinder 105 and outer conductor 102 at point 123. The conductor 104 is provided with the same structure as conductor 102 for moving the telescoping cylinder 125 toward or away from the fixed socket 126. It will be apparent that the same pressure source can be used for operating the switches of conductors 102 and 104 and also operating the switches at the other end of connecting line conductor 104.

It will be apparent that many modifications or variations of my invention and various arrangements other than those disclosed herein can be made without departing from the principles of my invention, and therefore the invention is not to be construed as limited except as defined in the following claims.

What is claimed is:

1. A transmission line switching system comprising a first set of two-conductor transmission lines, each having an input end; an independent radio-frequency source connected to each input end; a second set of two-conductor transmission lines, each line having an output end; an independent load connected to each such output end; the lines of one set being disposed transverse to the lines of the other set at a plurality of cross-over points; an interconnecting line at each cross-over point for connecting the conductors of corresponding cross-over transmission lines at that point; switching means normally in the circuit of each such transmission line and disposed at each such cross-over point and operative to open a connection in each conductor of the transmission line and to transfer its connection to a corresponding conductor of the adjacent interconnecting line, whereby the conductors of any line of the first set may be connected to the conductors of any line of the second set through the conductors of the adjacent interconnecting line and the two switching means; an enclosing duct for each line on both sides of each switching means and an enclosing duct for the interconnecting line, the three ducts being joined to communicate internally, and the sectional dimensions of the ducts being less than half wave length for any frequency that will be transmitted in regular use over said lines, whereby a duct section adjacent an open switch region and containing a disconnected section of line will function as a wave guide with a cut-off frequency above the frequencies being regularly transmitted by the transmission lines, thereby to electrically isolate such section of the line from energy transfer at such lower frequencies.

2. A system according to claim 1 wherein each switch includes means for removing an appreciable length of a conductor from one position as part of a given transmission line and connecting said length of conductor in a second position between said given transmission line conductor and a connecting line conductor; and a cut-out section in the duct to provide free passage space for each switch from the transmission line position to the connecting line position.

3. A system according to claim 2 wherein each switch includes a blade pivotally connected to constitute one portion of a transmission line conductor in one position and movable to a second position to connect said blade as a portion of the transmission line conductor to the conductor of the connecting line.

4. A system according to claim 1 wherein each of said switches includes rods telescoping with said conductors and means for retracting or extending one rod across a gap in a transmission line conductor and retracting or extending another rod between said inner conductor and a connecting line conductor adjoining it.

5. A system according to claim 4 including fluid pressure applying means for moving said rods.

References Cited in the file of this patent

UNITED STATES PATENTS

| | | |
|---|---|---|
| 2,034,026 | Curtis | Mar. 17, 1936 |
| 2,127,336 | Leng | Aug. 16, 1938 |
| 2,647,953 | Rowe | Aug. 4, 1953 |
| 2,938,999 | Etter | May 31, 1960 |